United States Patent [19]

Kajimura et al.

[11] 3,994,840
[45] Nov. 30, 1976

[54] EXPANDABLE STYRENE POLYMER PARTICLE COMPOSITION

[75] Inventors: Mutsuhiko Kajimura, Kusatsu; Tomohiko Ishida; Yoshinori Ikeda, both of Koga, all of Japan

[73] Assignee: Sekisui Kaseihin Kogyo Kabushiki Kaisha, Nara, Japan

[22] Filed: Jan. 23, 1976

[21] Appl. No.: 651,630

[30] Foreign Application Priority Data

Jan. 27, 1975 Japan .............................. 50-11741

[52] U.S. Cl. .......................... 260/2.5 B; 260/2.5 E; 260/45.9 NC; 260/45.75 W; 260/45.75 N; 264/51; 264/53; 526/910
[51] Int. Cl.² ............................................. C08J 9/20
[58] Field of Search ....... 260/2.5 B, 2.5 E, 45.75 W, 260/45.75 N, 45.9 NC; 264/51, 53

[56] References Cited

UNITED STATES PATENTS 3,551,360    12/1970    Dressler .......................... 260/2.5 FP

*Primary Examiner*—Morton Foelak
*Attorney, Agent, or Firm*—Armstrong, Nikaido & Wegner

[57] ABSTRACT

Expandable styrene polymer particle compositions containing an expanding agent which is volatilizable and does not dissolve or may slightly swell the styrene polymer particles and a small amount of sulfur containing compound having the general formula:

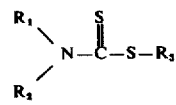

wherein, $R_1$ and $R_2$ are the same or different lower alkyl, aralkyl or aryl groups, $R_1$ and $R_2$ may be joined together to form an alkylene group, and $R_3$ is a metal ion, ammonium or organic amine each of which form soluble salts in an organic solvent, or a group

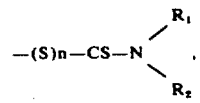

wherein n is an integer of from 0 to 5 and $R_1$ and $R_2$ are the same as the above.

6 Claims, No Drawings

EXPANDABLE STYRENE POLYMER PARTICLE COMPOSITION

BACKGROUND OF THE INVENTION

Expandable styrene polymer particles containing 1 to 20 weight % of a volatilizable expanding agent such as propane, butane, pentane, methyl chloride or dichlorofluoromethane in styrene polymer particles are already known. These expandable styrene polymer particles produce pre-expanded, cellular, polymer particles by heating them at a temperature above the softening point of the polymer particles. Cellular, shaped articles are obtained from the above pre-expanded polymer particles by heating, for example by steam, at a temperature above softening point of the polymer particles in a mold and fusing the polymer particles. Therefore, almost all cellular shaped articles are produced by using polymer particles, at the present time.

The distribution of cells in the cellular shaped articles are dependent upon cellular structure of the pre-expanded polymer particles. The distribution of cells in the pre-expanded polymer particles have an influence not only on the quality of the resulting cellular shaped articles but also on the operation of preparing the cellular shaped articles. Generally, pre-expanded polymer particles are heated by steam and fused in a mold to produce articles having the shape of the mold. However, the cellular shaped articles have a tendency to deform if the articles are removed without cooling under the temperature of the softening point of the polymer particles. In order to remove the cellular shaped articles without changing the shape, it is, generally, necessary to cool for a longer period of time than the heating time. Therefore, the cooling time is a very important factor in the manufacturing cycle of the cellular shaped articles. After molding, cellular shaped articles are cooled in the mold by a suitable cooling medium, for example, by water. Cooling must be continued until the internal portions of the article have cooled to a temperature below the softening point of the polymer. If it is removed from the mold beforehand, deformation may result. Since cellular shaped articles are good insulators, relatively long periods are necessary to cool the moldings. The period after which the cellular shaped articles may be removed from the mold without there being any subsequent deformation is usually called "minimum residence time."

For example, minimum residence time of cellular shaped articles having fine cells may be shortened in comparison with those having large cells, because the membranes of the cells become thinner as the cells becomes smaller and the remaining expanding agent is released more rapidly. The produced cellular shaped articles having fine cells do not deform even if the articles are removed from the mold while the articles are hot, since the inner pressure of the articles and post-expanding properties have been minimized. It becomes possible, therefore, to substantially shorten the period for cooling cellular shaped articles and, moreover, to obtain cellular shaped articles having highly desirable properties on a cut surface due to the very fine cell size.

It is difficult to control the cell size of pre-expanded polymer particles, since the distribution of the cell size is influenced by many factors, such as kind and quantity of expanding agent, the degree of polymerization of the polymer, e.g. styrene, and other unknown factors.

After the investigating a process for obtaining pre-expanded polymer particles having fine cells, we have found the following facts.

Pre-expanded styrene polymer particles expanded to a volume 70 times the original expandable styrene polymer particles, have a cell size in the range of from 0.01 to 0.3 mm in diameter on a cut surface. Cell sizes of from 0.08 to 0.3 mm are considered to be large cells. Cellular shaped articles having large cells are hard and have good heat-resistant properties. However, long cooling periods are required for cooling the cellular shaped articles in the mold. If such cellular shaped articles are removed from the mold before sufficient cooling, the articles further expand, because release of the expanding agent remaining in the cells have been delayed due to the thick membranes of the cell. Moreover, the cut surface or shaved faces of the cellular shaped articles are coarse, due to the large cell size.

On the other hand, cell sizes of smaller than 0.08 mm in diameter are considered to be fine cells. Cellular shaped articles having fine cells provide the advantage of shorter cooling periods, since the inner pressure of cells drops quickly, and, in turn, provides cut surfaces or shaved faces of the articles having desirable, fine properties. However, the surfaces of the pre-expanded particles are glossy and the surfaces of cellular shaped articles made therefrom are partially melted. Therefore, articles of inferior quality are produced.

In order to obtain pre-expanded styrene polymer particles having a fine cell size, U.S. Pat. No. 3,565,835 (Heinz Weber et al) shows the use of ammonium sulfate and U.S. Pat. No. 3,503,905 (Ludwig Zuern et al) shows the use of a brominated polymer of a 1,3-diene. These compounds are effective to obtain cellular shaped articles having fine cell size, however, they also have some defects. For example, it is difficult to obtain a homogeneous fine cell size, since the polymer particles are influenced by the storage temperature of the expandable polymer particles and heating temperature in the course of the pre-expansion step. Moreover, the obtained cellular shaped articles have a tendency to form an undesirable yellow color upon exposure to sun-light, ultraviolet rays etc. for long periods of time, since the above-mentioned compounds remaining in the articles are influenced by ultraviolet rays etc.

SUMMARY OF THE INVENTION

This invention relates to expandable styrene polymer particle compositions and to a method for preparing the same, and, more particularly, to expandable styrene polymer particle compositions containing an expanding agent in an amount of from about 1 to about 20% by weight of said polymer particles which is volatilizable and does not dissolve or may slightly swell the styrene polymer particles, and a sulfur containing compound in the amount of from 0.0001 to 0.05% by weight of said polymer particles, having the general formula:

wherein, $R_1$ and $R_2$ are the same or different lower alkyl, aralkyl or aryl groups, $R_1$ and $R_2$ may be joined together to form an alkylene group, and $R_3$ is metal ion, ammonium or organic amine each of which form soluble salts in an organic solvent, or a group

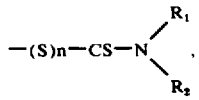

wherein n is an integer of 0 to 5, and $R_1$ and $R_2$ are the same as defined above.

During the investigation for improving the undesirable effects of the above polymer particles, we have found that improvement is achieved by including a small amount of specific compound in the expandable styrene polymer particles, to obtain pre-expanded polymer particles expanded to about 70 times the original particles and having a fine cell size smaller than 0.08 mm, preferably smaller than 0.05 mm, having no glossy surfaces and not having the tendency to discolor upon exposure to ultraviolet rays etc., and furthermore, having substantially uniform cell size which is not affected by the change of atmospheric temperatures.

DETAILED DESCRIPTION OF THE INVENTION

Styrene polymer particles of the present invention include polymer particles prepared by the polymerization of vinyl aromatic monomers including styrene, vinyltoluene, isopropyltoluene, α-methyltoluene, nuclear methylstyrene, chlorostyrene, tert-butylstyrene etc.; styrene copolymer particles prepared by the copolymerization of a styrene monomer with monomers such as 1,3-butadiene, alkyl acrylates (for example, butyl acrylate, ethyl acrylate and 2-ethylhexyl acrylate), alkyl methacrylates (for example, methyl methacrylate, butyl methacrylate and 2-ethylhexyl methacrylate), acrylonitrile, vinyl acetate, α-methylethylene, divinylbenzene, dimethyl maleate and diethyl maleate, wherein the styrene monomer is present in an amount of at least about 50% by weight based on the copolymer.

Styrene polymer particles can, of course, be produced by any of the known techniques, for example, by suspension or mass polymerization, to obtain particles in the form of beads or pellets. Such polymer particles have an average particle diameter of from 0.2 to 6 mm, preferably from 0.4 to 3 mm.

The expanding agents employed in the present invention include those which do not dissolve the styrene polymer particles, or slightly swell the polymer particles and which have a boiling point lower than the softening point of the polymer particles. The expanding agents include aliphatic hydrocarbons such as propane, butane, isobutane, pentane, neopentane, isopentane, hexane and butadiene; aliphatic cyclic hydrocarbons such as cyclobutane, cyclopentane and cyclohexane and halogenated hydrocarbons such as methyl chloride, methylene chloride, dichlorofluoromethane, chlorotrifluoromethane, dichlorodifluoromethane, chlorodifluoromethane and trichlorofluoromethane. These expanding agents are impregnated into the polymer particles in an amount of from 1% to 20% by weight of the styrene polymer particles.

When propane, butane or mixtures thereof are used as the expanding agent, it is preferred that a small amount of an organic solvent be employed which can dissolve the styrene polymer particles. Such organic solvents include ethylenedichloride, trichloroethylene, tetrachloroethylene, benzene, toluene and xylene. These organic solvents are used in amounts of from 0.01 to 3% by weight, preferably from 0.05 to 2% by weight of the polymer particles.

The sulfur containing compounds employed in the present invention are shown in the above-mentioned general formula (I). The sulfur containing compounds include thiuram compounds (where $R_3$ represents a group

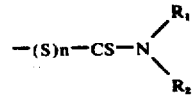

in general formula (I) ) and dithiocarbamate (where $R_3$ represents a metal ion, ammonium or organic amine).

In general formula (I), $R_1$ and $R_2$ include alkyl groups such as methyl, ethyl, propyl and butyl aralkyl group such as benzyl and aryl groups such as phenyl and tolyl. Methylene groups formed by joining $R_1$ and $R_2$ include tetramethylene and pentamethylene groups.

Thiuram compounds include, for example, tetramethyl thiuram monosulfide, tetramethyl thiuram disulfide, tetraethyl thiuram disulfide, tetrabutyl thiuram monosulfide, tetrabutyl thiuram disulfide, N,N'-dimethyl-N,N'-diphenyl thiuram disulfide, dipentamethylene thiuram monosulfide, dipentamethylene thiuram disulfide, dipentamethylene thiuram tetrasulfide, dipentamethylene thiuram hexasulfide and dicyclopentamethylene thiuram disulfide. These thiuram compounds may be used alone or in combinations of 2 or more thiuram compounds.

The dithiocarbamate compound shown in general formula (I) (where $R_3$ represents a metal ion, ammonium or organic amine metal ion such as Zn, Cu, Fe, Ni, Se, Te, Pb, Cd, etc. and organic amine such as dialkylamine as dimethylamine diethylamine and dibutylamine and cyclic amine such as piperdine) includes dialkyl dithiocarbamate, diaralkyl dithiocarbamate diaryl dithiocarbamate and alkyl aryl dithiocarbamate. Specific dithiocarbamates include, for example, zinc dimethyl dithiocarbamate, zinc diethyl dithiocarbamate, zinc dibutyl dithiocarbamate, zinc ethyl phenyl dithiocarbamate, copper dimethyl dithiocarbamate, ferric dimethyl dithiocarbamate, selenium diethyl dithiocarbamate, tellurium diethyl dithiocarbamate, zinc dibenzyl dithiocarbamate, zinc N-pentamethylene dithiocarbamate, lead dimethyl dithiocarbamate, zinc dibutyl dithiocarbamate dibutylamine complex, cadmium diethyl dithiocarbamate, dibutyl ammonium dibutyl dithiocarbamate, diethylamine diethyl dithiocarbamate, piperidine pentamethylene dithiocarbamate nickel dibutyl dithiocarbamate, etc.

After various investigations, we have found that the sulfur containing compounds having general formula (I) are extremely effective to obtain pre-expanded polymer particles having a fine cell size and are also effective to increase the heat-resistant properties of the polymer particles.

According to the present invention, the surfaces of the pre-expanded styrene polymer particles are not glossy, although the polymer particles have fine cells. As a result, cellular shaped articles having no melted surface are provided by the same method as the articles having large cells.

The sulfur containing compounds of general formula (I) are employed in an amount of from 0.0001 to 0.05% by weight, preferably from 0.0005 to 0.25% by weight of styrene polymer particles. In the case of employing more than the above limited amount of the sulfur containing compounds, further improvement is not substantially obtained and the quality of the styrene polymer particles is reduced. In the case of employing less than the above limited amount of the sulfur containing compounds, fine cells are not obtained. Therefore, both results are not desirable. The sulfur containing compounds are, generally, used alone, however, they may be used in combinations of two or more.

Styrene polymer particles containing sulfur compounds of general formula (I) are produced by the following processes:

A solution of the sulfur containing compound formed by dissolving in a suitable solvent is added to an aqueous suspension of styrene polymer particles. The resulting mixture is heated while stirring and styrene polymer particles having incorporated therein the sulfur containing compound are obtained.

The styrene polymer particles containing the sulfur containing compounds are also obtained by adding the sulfur containing compound during the process of polymerizing styrene. In this case, the sulfur containing compounds should be added in amounts of not more than 0.025% by weight of resulting styrene polymer particles, in order that the sulfur containing compounds do not act as chain transfer agents or polymerization retarders.

In the process of polymerizing styrene monomer, polymerization catalysts are used. Polymerization catalysts include organic peroxides such as benzoyl peroxide, lauroyl peroxide, t-butyl perbenzoate, t-butyl peroxypivalate, etc. and azo-compounds such as azo-bis-isobutylonitrile, azo-bis-dimethylvaleronitrile etc, In order to sufficiently suspend the styrene polymer particles in an aqueous medium, suspending agents are used. The suspending agents include slightly water-soluble fine powders such as calcium phosphate, calcium pyrophosphate, sodium pyrophosphate, calcium carbonate, calcium silicate, bentonite, calcium hydroxide, magnesium oxide, etc,; metal salts of fatty acids such as calcium stearate, zinc stearate, etc.; fatty acid bisamides such as ethylene-bis-stearoamide etc. and water-soluble polymer compounds such as polyvinylalcohol, methyl cellulose, polyacrylamide etc. These suspending agents are generally used in an amount of from 0.2 to 3% by weight of water.

Expandable styrene polymer particles of the present invention produce pre-expanded styrene polymer particles upon heating and have a uniform fine cell size, in comparison with the undesirable pre-expanded styrene polymer particles which do not contain the sulfur compounds of the general formula (I). The pre-expanded styrene polymer particles produced by the present invention, therefore, are especially useful for obtaining cellular shaped articles having a beautiful appearance and providing cooling periods substantially shorter than that known in the art in removing them from the mold.

The following examples are illustrative of the present invention but are not intended to limit the scope thereof.

EXAMPLE 1

2200 g of styrene monomer, 6 g of benzoyl peroxide, 1.2 g of t-butyl perbenzoate and 0.11 g (0.005 wt. % based on resulting styrene polymer particles) of the sulfur containing compound described in the Table 1 were introduced into a 5.6 liter autoclave equipped with a mechanical stirrer. To the above mixture, 2200 g of pure water, 9.0 g of sodium pyrophosphate 10-hydrate and 0.48 g of sodium dodecylbenzene-sulfonate were added. The resulting mixture was heated to 80° C while stirring, and 10 g of magnesium chloride 6-hydrate were added. After reacting for 15 hours while maintaining a temperature of 80° C, the mixture was heated to 100° C, and 66 g of propane and 200 g of pentane were added. The reaction was continued for an additional 6 hours. Then, the autoclave was cooled to 30° C, and the produced expandable styrene polymer particles were desiccated and dried.

After aging for 1 week at 15° C, expandable styrene polymer particles, having passed through a sieve having a 10 – 14 mesh ASTM (mesh opening 1.41 – 2.00 mm) were expanded by steam to form pre-expanded styrene polymer particles having 70 times the original volume.

After aging for 24 hours, the pre-expanded styrene polymer particles were fed into a mold cavity having a size of 300 mm × 400 mm × 100 mm, and heated by steam to produce the cellular shaped articles. Minimum residence time, distribution of the cell size and average cell size are shown in the Table 1. Results of expandable styrene polymer particles prepared in the same manner described in Example 1, without using any sulfur containing compounds, are shown as comparative data with the present invention.

Table 1

| Sulfur compound of general formula (I) | minimum residence time (second) | distribution of cell size (mm) | average cell size (mm) |
|---|---|---|---|
| none added | 420 | 0.05 – 0.2 | 0.18 |
| tetramethyl thiuram mono-sulfide | 250 | 0.03 – 0.07 | 0.04 |
| tetrabutyl thiuram di-sulfide | 270 | 0.03 – 0.08 | 0.05 |
| N,N'-dimethyl-N,N' di-phenyl thiuram disulfide | 300 | 0.04 – 0.10 | 0.07 |
| dipentamethylene thiuram tetra-sulfide | 290 | 0.03 – 0.08 | 0.06 |
| dipentamethylene thiuram hexa-sulfide | 300 | 0.03 – 0.10 | 0.07 |

EXAMPLE 2

The process of Example 1 was substantially repeated changing the quantity of dipentamethylene thiuram tetrasulfide and the time of reaction of 80° C. The resulted date are shown in Table 2.

Table 2

| added quantity (%) | minimum residence time(second) | distribution of cell size (mm) | average cell size (mm) | reaction time at 80°C (hour) |
|---|---|---|---|---|
| 0.05 | 280 | 0.02–0.05 | 0.04 | 48 |
| 0.025 | 280 | 0.02–0.06 | 0.04 | 22 |
| 0.005 | 290 | 0.03–0.08 | 0.06 | 15 |
| 0.0005 | 320 | 0.04–0.10 | 0.07 | 15 |
| 0.0001 | 380 | 0.05–0.17 | 0.12 | 15 |
| none added | 420 | 0.05–0.20 | 0.18 | 15 |

EXAMPLE 3

2000 g of pure water, 800 g of styrene polymer particles passed through a sieve having a mesh opening of 1.41 – 1.00 mm, 9 g of sodium pyrophosphate 10-hydrate and 0.48 g of sodium dodecylbenzenesulfonate were introduced into a 5.6 liter autoclave equipped with a mechanical stirrer. After heating to 85° C, 10 g of magnesium chloride 6-hydrate were added to the above mixture. Then, a mixed solution of 200 g of styrene monomer and 0.05 g of dipentamethylene thiuram disulfide dissolved in 30 g of toluene was added. A solution of 1000 g of styrene monomer, 4.8 g of benzoyl peroxide and 1.2 g of t-butyl perbenzoate was added over a period of 3 hours while maintaining a temperature of 85° C. After heating the mixture to 100° C, the reaction was carried out for 6 hours. Then, 80 g of propane and 140 g of butane were added under pressure, and the reaction was continued for an additional 6 hours to obtain expandable styrene polymer particles. When the obtained expandable styrene polymer particles were expanded to cellular shaped articles, the minimum residence time during molding was 300 seconds, distribution of cell size was 0.02 – 0.10 mm and the average cell size was 0.07 mm.

As a comparative example, the procedure of the above Example was substantially repeated except that dipentamethylene thiuram disulfide was omitted. In this case, the minimum residence time was 610 seconds, distribution of cell size was 0.1 – 0.3 mm and the average cell size was 0.22 mm.

EXAMPLE 4

2200 g of styrene polymer particles passed through a sieve having a 10 – 14 mesh ASTM (mesh opening 1.41 – 2.00 mm), 2200 g of pure water 6 g of $Mg_2P_2O_7$ prepared by double decomposition, 0.4 g of sodium dodecylbenzene-sulfonate and 0.44 g of dipentamethylene thiuram hexasulfide were introduced into a 5.6 liter autoclave equipped with a mechanical stirrer. To this mixture, 44 g of propane and 176 g of pentane were added and the temperature was raised to 100° C and impregnation was carried out for 5 hours to obtain expandable styrene polymer particles. When the obtained expandable styrene polymer particles were expanded to cellular shaped articles as described in Example 1, the minimum residence time during molding was 310 seconds, distribution of cell size was 0.02 – 0.1 mm and the average cell size was 0.08 mm.

As a comparative example, the process of the above Example was substantially repeated except that dipentamethylene thiuram disulfide was omitted. In this case, the minimum residence time was 450 seconds, distribution of cell size was 0.07 –0.3 mm and the average cell size was 0.18 mm.

EXAMPLE 5

The process of Example 1 was substantially repeated using dithiocarbamates listed in Table 3, instead of a thiuram compound. The results obtained are shown in Table 3.

Table 3

| sulfur compound of general formula (1) | minimum residence time(second) | distribution of cell size (mm) | average cell size (mm) |
| --- | --- | --- | --- |
| zinc diethyl dithiocarbamate | 300 | 0.04 – 0.10 | 0.08 |
| zinc ethyl phenyl dithiocarbamate | 270 | 0.03 – 0.07 | 0.06 |
| copper dimethyl dithiocarbamate | 320 | 0.05 – 0.10 | 0.08 |
| none added | 420 | 0.05 – 0.2 | 0.18 |

EXAMPLE 6

The process of Example 1 was substantially repeated using various quantities of zinc diethyl dithiocarbamate instead of a thiuram compound. The results obtained are shown in Table 4.

The reaction time was changed according to the amount of zinc diethyl dithiocarbamate employed.

Table 4

| added quantity of zinc diethyl dithiocarbamate (%) | minimum residence time(second) | distribution of cell size (mm) | average cell size (mm) | reaction time at 80° C(hour) |
| --- | --- | --- | --- | --- |
| 0.05 | 290 | 0.03 – 0.09 | 0.07 | 45 |
| 0.025 | 290 | 0.04 – 0.09 | 0.07 | 20 |
| 0.005 | 300 | 0.04 – 0.10 | 0.08 | 15 |
| 0.0005 | 330 | 0.05 – 0.12 | 0.10 | 15 |
| 0.0001 | 390 | 0.05 – 0.15 | 0.12 | 15 |
| none added | 420 | 0.05 – 0.20 | 0.18 | 15 |

EXAMPLE 7

The process of Example 3 was substantially repeated using zinc ethyl phenyl dithiocarbamate instead of dipentamethylene thiuram disulfide.

When the obtained expandable styrene polymer particles were expanded to form cellular shaped articles, the minimum residence time was 330 seconds, distribution of the cell size was 0.04 – 0.12 mm and the average cell size was 0.09 mm.

As a comparative example, the process of the above Example was substantially repeated except that zinc ethyl phenyl dithiocarbamate was omitted. In this case, the minimum residence time was 610 seconds, distribution of the cell size was 0.1 – 0.3 mm and the average cell size was 0.22 mm.

EXAMPLE 8

The process of Example 4 was substantially repeated using nickel dibutyl dithiocarbamate instead of dipentamethylene thiuram hexasulfide.

When the obtained expandable styrene polymer particles were expanded to form cellular shaped articles, the minimum residence time was 350 seconds, the distribution of the cell size was 0.03 – 0.11 mm and the average cell size was 0.09 mm.

As a comparative example, the process of the above Example was substantially repeated except that nickel dibutyl dithiocarbonate was omitted. In this case, the minimum residence time was 450 seconds, the distribution of the cell size was 0.07 – 0.3 mm and the average cell size was 0.18 mm.

EXAMPLES 9 – 14

The process of Example 1 was substantially repeated using 0.055 g of each compound in a combination of sulfur compounds of general formula (I), instead of 0.11 g of thiuram compound.

The obtained results are shown in the Table 5.

Table 5

| Example No. | Sulfur compound of general formula (I) | minimum residence time(second) | distribution of cell size (mm) | average cell size (mm) |
|---|---|---|---|---|
| 9 | dipentamethylene thiuram tetrasulfide | 300 | 0.03 – 0.09 | 0.07 |
| 10 | dipentamethylene thiuram hexasulfide tetraethyl thiuram disulfide | 250 | 0.03 – 0.07 | 0.05 |
| 11 | tetramethyl thiuram monosulfide zinc dibutyl dithiocarbamate | 280 | 0.03 – 0.08 | 0.06 |
| 12 | zinc ethyl phenyl dithiocarbamate nickel dibutyl dithiocarbamate | 320 | 0.05 – 0.1 | 0.08 |
| 13 | ferric dimethyl dithiocarbamate dipentamethylene thiuramhexasulfide | 310 | 0.03 – 0.08 | 0.07 |
| 14 | zinc diethyl dithiocarbamate tetrabutyl thiuram disulfide | 280 | 0.03 – 0.09 | 0.06 |
|  | copper diethyl dithiocarbamate |  |  |  |

What is claimed is:

1. Expandable styrene polymer particle compositions comprising styrene polymer particles containing an expanding agent which is volatilizable and does not dissolve or may slightly swell the styrene polymer particles in an amount of from about 1 to about 20% by weight of the styrene polymer particles and a sulfur containing compound having the general formula:

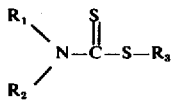

wherein, $R_1$ and $R_2$ are the same or different groups selected from the group consisting of lower alkyl, aralkyl and aryl and $R_1$ and $R_2$ may be joined together to form an alkylene group, and $R_3$ is a group selected from the group consisting of metals, ammonium and organic amines which form soluble salts in an organic solvent and

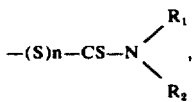

wherein n is an integer of from 0 to 5 and $R_1$ and $R_2$ are the same as defined above, said sulfur containing compound being present in an amount of from 0.0001 to 0.05% by weight of the styrene polymer particles, said sulfur containing compound being used for the purpose of obtaining a lower minimum residence time, fine pore size and fast cooling when the composition is molded and foamed.

2. The composition of claim 1, wherein the styrene polymer particles are prepared by the polymerization of aromatic vinyl monomer selected from the group consisting of styrene, vinyltoluene isopropyltoluene, α-methylstyrene, nuclear methylstyrene, chlorostyrene and t-butylstyrene.

3. The composition of claim 1, wherein the styrene polymer particles are copolymers prepared by the copolymerization of a styrene monomer with copolymerizable monomers selected from the group consisting of 1,3-butadiene, butyl acrylate, ethyl acrylate, 2-ethylhexyl acrylate, methyl methacrylate, butyl methacrylate, 2-ethylhexyl methacrylate, acrylonitrile, vinyl acetate, α-methylethylene, divinylbenzene, dimethylmaleate and diethylmaleate, the styrene monomer being present in an amount of at least 50% by weight based on the copolymer.

4. The composition of claim 1, wherein the expanding agent is selected from the group consisting of propane, butane, isobutane, pentane, neopentane, isopentane, hexane, butadiene, cyclobutane, cyclopentane, cyclohexane, methyl chloride, methylene chloride, dichlorofluoromethane, chlorotrifluoromethane, dichlorodifluoromethane, chlorodifluoromethane and trichlorofluoromethane.

5. The composition of claim 1, wherein the sulfur containing compound is a thiuram compound selected from the group consisting of tetramethyl thiuram monosulfide, tetramethyl thiuram disulfide, tetraethyl thiuram disulfide, tetrabutyl thiuram monosulfide, tetrabutyl thiuram disulfide, N,N'-dimethyl-N,N'-diphenyl thiuram disulfide, dipentamethylene thiuram monosulfide, dipentamethylene thiuram disulfide, dipentamethylene thiuram tetrasulfide, dipentamethylene thiuram hexasulfide and dicyclopentamethylene thiuram disulfide.

6. The composition of claim 1, wherein the sulfur compound is a dithiocarbamate selected from the group consisting of zinc dimethyl dithiocarbamate, zinc diethyl dithiocarbamate, zinc dibutyl dithiocarbamate, zinc ethyl phenyl dithiocarbamate, copper dimethyl dithiocarbamate, ferric dimethyl dithiocarbamate, selenium diethyl dithiocarbamate, tellurium diethyl dithiocarbamate, zinc dibenzyl dithiocarbamate, zinc N-pentamethylene dithiocarbamate, lead dimethyl dithiocarbamate, zinc dibutyl dithiocarbamate dibutylamine complex, cadmium diethyl dithiocarbamate, dibutyl ammonium dibutyl dithiocarbamate, diethylamine diethyl dithiocarbamate, piperidine pentamethylene dithiocarbamate and nickel dibutyl dithiocarbamate.

* * * * *